INVENTOR.
RUDOLPH E. KRUEGER

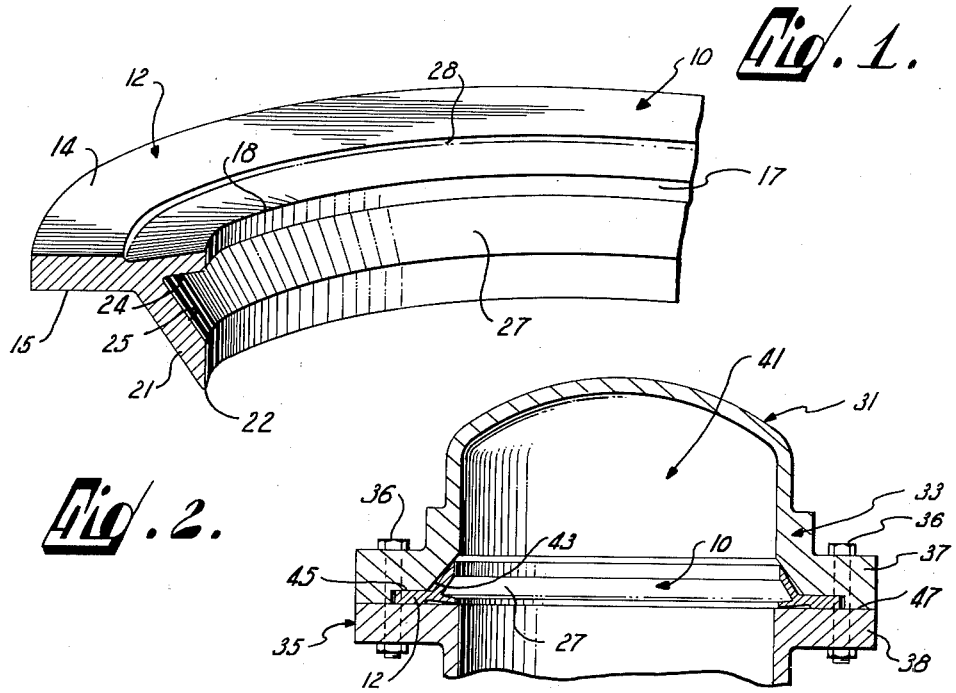

United States Patent Office 3,042,248
Patented July 3, 1962

3,042,248
HIGH PRESSURE CLOSURES
Rudolph E. Krueger, 2808 N. Naomi St., Burbank, Calif.
Filed Apr. 7, 1958, Ser. No. 726,752
5 Claims. (Cl. 220—46)

The invention relates to high pressure closures and more particularly to such closures for use in systems subjected to extremes of temperature.

The combination of high pressure and high heat presents a problem for closures which depend for sealing upon seal rings pressed between mating members of the joint. A seal ring sufficiently flexible to seal against the high pressure is conventionally of a material that deteriorates under high temperatures. Therefore, in high pressure, high temperature systems the problem is to find a sealing member for joints which is capable of a tight seal with respect to the high pressure and which does not deteriorate because of the high heat. Extreme cold also affects the conventional sealing materials such as rubber or plastic. These materials tend to harden at low temperatures such as —100° F., and further lessening of temperature tends to induce leakage paths in the sealing material.

It is desirable in high pressure closures to use seal rings that possess physical characteristics compatible with those of the closure materials. The seal ring and closure should be similar in coefficient of expansion, elasticity, chemical resistance, etc. These characteristics are preferably similar over the entire range of operating conditions. Such matching of characteristics is not possible with conventional sealing materials and closures.

I have invented a high pressure closure which may use a metallic seal ring resistant to high temperatures. The configuration of the closure is such that high pressure does not induce leakage. The seal ring itself tends to seal more tightly as the pressure increases.

In a high pressure closure the invention contemplates the combination which comprises a first and a second joint member with the first joint member having a substantially planar sealing surface. The second joint member may have either a frusto-conical or planar sealing surface. An annular seal ring spacer body is interposed between the first and the second joint members. The seal ring has a first annular lip which extends from the spacer body. A second annular lip extending similarly from the spacer body diverges from the first annular lip.

The diverging lips define an annulus having a V-shaped cross-section. The V-shaped annulus is exposed to the pressure contained at the joint. The pressure may be exerted from within or without the joint. The pressure tends to push the diverging lips further apart into stronger contact with the sealing surfaces of the two joint members which the first and second lips respectively contact.

The preferred seal ring of the invention comprises an annular spacer body from which first and second annular lips extend inwardly and diverge from each other. The spacer body has substantially planar and parallel upper and lower surfaces. The first annular lip diverges from the inner portion of the annular spacer body so that the displacement of the innermost edge of the first annular lip with respect to the median plane of the annular body is greater than the displacement therefrom of the upper surface of the body. Preferably, the root of the first annular lip is closer to the median plane of the spacer body than is the upper planar surface of the body. Thus, when the joint member in contact with the annular lip is closed against the seal ring the sealing surface of the joint member contacts the upper surface of the body and still makes only line contact with the uppermost edge of the first annular lip.

Similarly, the divergent angle of the second annular lip is preferably such that a frusto-conical sealing surface of the second joint member contacts the second annular lip in a line rather than in surface to surface contact. In other words, the frusto-conical surface of the second annular lip which is outermost with respect to the median plane of the spacer body is a frustum of a lesser cone than is the sealing surface of the second joint member.

Since the second annular lip is frusto-conical and seats against a frusto-conical sealing surface, the preferred seal ring of the invention is self-centering. It aligns itself concentrically with the sealing surface of the second joint member. There is no orientation difficulty with respect to the first annular lip and the substantially planar surface of the first joint member. Once the seal ring is oriented by the relationship between the second lip and the second sealing surface, the first joint member may be joined to the second joint member in any conventional manner and a sealing line of contact is established between the first lip and he planar surface of the first joint member.

These and further advantages of the invention are illustrated in the following detailed specification and drawings in which:

FIG. 1 is a fragmentary perspective view of a preferred seal ring in accordance with the invention;

FIG. 2 is a fragmentary sectional elevation of a pressure vessel having a closure in accordance with the invention;

FIG. 3 is a fragmentary elevation partly in section of a plug closure subject to high pressure and high temperature and made in accordance with the invention;

Figure 4:
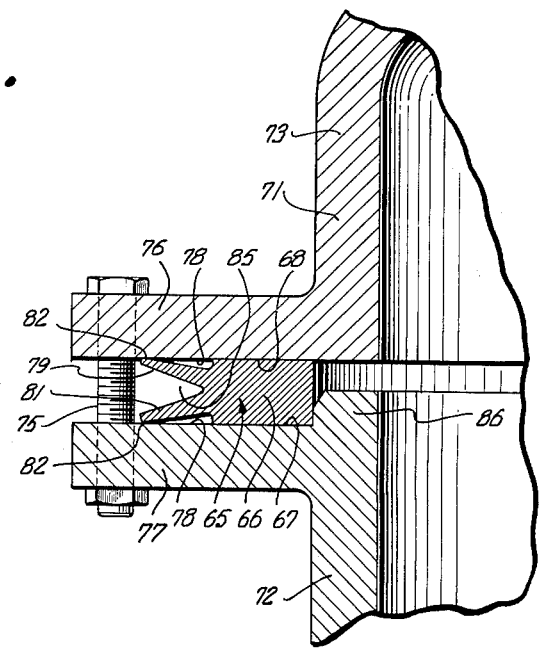
FIG. 4 is a fragmentary sectional elevation illustrating an alternate embodiment of the closure of the invention.

FIG. 1 illustrates fragmentarily a seal ring 10 having an annular spacer body 12. The spacer body is defined in part by an obverse surface 14 and a reverse surface 15. The surfaces are parallel. A first annular sealing lip 17 projects inwardly from the spacer body. The first lip diverges upwardly in FIG. 1 so that an innermost edge 18 projects above the extension of obverse spacer body surface 14. The inner edge is the sealing edge of the first lip. A second annular sealing lip 21 projects inwardly from adjacent the reverse surface 15 of the spacer body. Second lip 21 terminates in an inner edge 22 defining a sealing line of the second lip. Lower and upper surfaces 24, 25 of the first and second lips respectively define an inwardly opening V-shaped annulus 27. Normally this annulus is exposed to the high pressure of the joint which the ring seals.

A shoulder 28 defines the inner limit of the obverse face. The first lip extends from the spacer body at the lower edge of the shoulder. Presence of the shoulder allows freer deflection of the lip with respect to the body. The divergence of the second lip is greater with respect to the median plane of the spacer body than is the divergence of the first one.

FIG. 2 illustrates fragmentarily a pressure vessel 31 having an upper joint member or cover 33. The upper joint member is secured to a lower joint member 35 by conventional means such as a plurality of bolts 36 extending through flanges 37, 38 of the upper and lower joint members respectively. The joint members define a volume 41 which may be subjected to high pressure and extreme temperature. The seal ring 10, similar in all respects to the seal ring of FIG. 1, is shown in sealing position with respect to the two joint members. The upper joint member or cover 33 has an inner frusto-conical sealing annulus 43. The conical annulus extends from the inner wall of the cover to a second substantially cylindrical annulus 45. The extent of the frusto-conical sealing surface should be greater than the extent of the second lip of the seal ring so that the sealing edge 22 of the second lip makes sealing contact with the frusto-conical surface.

Cylindrical annulus 45 houses spacer body 12. The spacer body is restrained within the annulus by the substantially planar sealing surface 47 of lower joint member 35.

Edge 18 of the seal ring projects beyond obverse face 14 of the spacer body when the seal ring is free. However, when in place, as shown in FIG. 2, the clamping force securing the two joint members compresses the first and second lips toward each other. Therefore, the seal ring is preferably made of a metal having resilient qualities so that a sealing force is exerted by the compressed lips against the surfaces which the lips contact. The initial sealing load may be determined by the thickness of the spacer body, which would control the deflection of the lips.

Annulus 27 of seal ring 10 is subjected to the pressure within volume 41. As can be seen in FIG. 2, pressure within the annulus tends to force the lips apart and thus causes each lip to exert a pressure against its sealing surface. Therefore, in contrast to conventional seals, any increase in pressure is compensated for by an increase in sealing force.

FIG. 3 shows a seal ring 51 of a resilient heat-resisting material such as stainless steel or aluminum alloy. The seal ring is similar in all respects to the seal ring of FIG. 1, so like parts are identified by like numbers. The seal is shown in place in a plugged outlet 52. The plugged outlet comprises an internally threaded bore 53 and an externally threaded plug 55.

The threaded bore entrance is relieved by a conical seat 57. The taper of sealing lip 21 is such that only line contact is made between the under surface of the lip and the rounded termination 58 of the conical seat. The hexagonal head of plug 55 has a sealing surface 59 which is substantially planar. This surface is shown in contact with sealing edge 18 of sealing ring 51. The sealing ring as illustrated in FIG. 3 has not been compressed since plug 55 is not yet threaded tightly into inlet bore 53. Therefore the obverse and reverse faces of the spacer body do not contact the planar surface of plug 55 or a planar surface 61 disposed outside of conical sealing surface 57 and at the top of the plug outlet.

Both of the sealing lips project beyond the planes of the obverse and reverse faces of the spacer body. The compressive force on these lips when the two components of the joint to be sealed are brought together increases the sealing pressure on the lips against the sealing surfaces of the two components. The sealing ring may be made of metal so that it may withstand heat conditions which may be present in a high pressure system. The thickness of the spacer body may be varied to control in some measure the maximum amount of compression imposed upon the lips. The radial width of the body is determined by the bursting pressure which the sealing ring must contain and the characteristics of the material of which the sealing ring is made.

The sealing ring may be coated with an anti-galling film. The film may be tinplate, silverplate, teflon or goldplate. All of these substances resist temperature extremes.

A closure embodying the invention in which the sealing ring and closure members are oriented respectively by coordinating frusto-conical surfaces of a joint member and the sealing ring was described with reference to FIGS. 1–3. This configuration is achieved by lips which diverge at different angles from the spacer body. This is the preferred configuration for the closure. FIG. 4 illustrates a closure in which the sealing surfaces of both joint members are substantially planar and the diverging lips of the sealing ring diverge at substantially equal angles from the median plane of the spacer ring. For instance, in FIG. 4 a sealing ring indicated generally by the reference character 65 has an annular spacer body 66 having substantially parallel obverse and reverse faces 67, 68 respectively. The body is retained between first and second closure members 71, 72 of a pressure vessel 73. The pressure vessel may be of a type which operates at an internal pressure substantially below the ambient exterior pressure.

The two joint members are held together by a plurality of fasteners such as the bolt 75, passing through flanges 76, 77 of the joint members. Each joint member has a substantially planar sealing surface 78. The sealing surfaces of the joint members seat against the parallel faces of the spacer body. Additionally they bear against diverging lips 79, 81, of the sealing gasket. The angle at which the annular lips diverge and the configuration of each of the lips is such that an edge 82 of each lip seats in line contact against the sealing surface of the respective joint member.

Reference to FIG. 4 shows that an annulus 85 having a substantially V-shaped cross-sectional configuration is defined by the diverging lips. In FIG. 4 this annulus is oriented outwardly of the spacer body. It is thus exposed to the greater pressure since this orientation is used when an internal operating pressure of the vessel is less than the exterior pressure. Therefore, as the pressure within the sealed vessel drops, a greater pressure differential applies more force to the diverging lips. The lip configuration is such that the greater pressure differential results in a proportionately greater loading of each lip against the sealing surface of a joint member.

In order to provide the proper flexure for the diverging lips they may be fabricated so that they taper to a smaller cross-sectional dimension near their outer end. By such design the desired initial normal loading of the diverging lips against the sealing surfaces may be made an inherent part of the sealing ring.

When the sealing ring is placed in position between the first and second joint members of the embodiment of FIG. 4 no contact between frusto-conical surfaces serves to orient the sealing ring of the invention with respect to the joint members. Therefore, it is preferable that one of the joint members have an annular boss such as the boss 86 of the second joint member 72 to locate the sealing ring.

Figure 5:
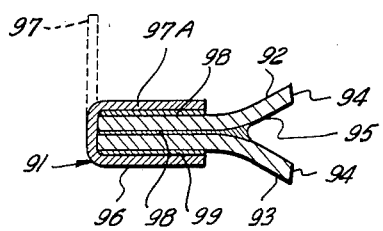
FIG. 5 is a fragmentary sectional elevation of an alternate seal ring according to the invention.

FIG. 5 illustrates a sealing ring in accordance with the invention which is fabricated by a stamping process from three individual pieces rather than being shaped from a single piece. In FIG. 5 a sealing ring 91 has substantially identical upper and lower ring members 92, 93, respectively. Each of the rings is shaped so that when joined back to back they have diverging lip sections 94 which define a V-shaped annulus 95. Joining may be accomplished by silver soldering or other like techniques.

In addition to the two stamped rings 92 and 93 a binding ring 96 is bent about the parallel sections of the two stamped rings. The binding ring may be made L-shaped in the original stamping as indicated by the dotted lines 97. The upstanding portion of the L-shaped ring is then bent downwardly and assumes a position shown by the solid lines 97A. In this position the binding ring has substantially parallel obverse and reverse surfaces which perform the same function as the spacer body of the previously described embodiments of the invention.

The three basic elements of the alternate embodiment of the invention may be joined together by a plurality of solder layers 98. The alternate embodiment illustrated in FIG. 5 is used in similar fashion to the previously described embodiments. It has the advantage of adaptability to fabricating processes which are conventionally less expensive than the machining process necessary for the fabrication of sealing rings 65 or 10.

The joint and sealing ring designs in accordance with the invention are such that they may be adapted to many different uses. The sealing surfaces of the joint members of the closure using either form of the sealing rings illustrated are substantially less complicated than the sealing surfaces necessary in conventional closure systems. Any embodiment of the closure of the invention may use sealing rings compatible in most physical charatceristics with the material used in the joint members of the closure. All of the illustrative sealing rings may be coated with an anti-galling film and each closure is usable under conditions of great pressure differential and extreme temperature variation.

Additionally, the preferred sealing ring of the invention provides initial spring loaded sealing contact which may be of a pre-selected force. The sealing force then increases with an increase in the pressure to be sealed against, so that the initial spring load is augmented by the imposed pressure to effect adequate sealing contact.

I claim:

1. In a high pressure closure the combination comprising a first joint member having a sealing surface, a second joint member having a sealing surface, an annular metallic spacer body between the first joint member and the second joint member, a first annular metallic sealing lip extending from the spacer body, and a second annular metallic sealing lip extending from the spacer body to define an annulus between the first and second lips, each lip having an annular portion diverging away from the spacer body and toward a joint member, each diverging annular portion having only a line contact with the sealing surface of the respective adjacent joint member in final operative sealing position.

2. In a high pressure closure the combination comprising first and second joint members having separate sealing surfaces, an annular metallic spacer body between the first and second joint members, and first and second annular metallic lips extending from the spacer body to define an annulus between them and oriented with respect to the pressure sealed against so that the annulus is open to the pressure, each annular lip having an annular portion diverging away from the spacer body and toward a sealing surface of a separate joint member, each diverging annular portion having only a line contact with the sealing surface of the respetcive adjacent joint member in final operative sealing position.

3. In a high pressure closure the combination comprising first and second joint members having separate sealing surfaces, an annular metallic spacer body having parallel obverse and reverse surfaces, a first metallic annular sealing lip extending from the body, and a second metallic annular sealing lip extending from the body and diverging from the first lip, the first lip having an annular portion diverging from a zone of the annular body spaced toward the reverse surface from the obverse surface to extend beyond the planar extension of the obverse surface, and the second lip having an annular portion diverging from a zone coincident with the reverse surface of the annular body to extend beyond the planar extension of the reverse surface, each annular diverging portion having only a line contact with the sealing surface of the respective adjacent joint member in final operative sealing position.

4. In a high pressure closure the combination comprising a first joint member having a substantially planar sealing surface, a second joint member including a compound joining area having a planar segment and a frusto-conical sealing surface, an annular metallic spacer body interposed between the first joint member and the planar segment of the second joint member, a first annular metallic lip extending inwardly from the spacer body, and a second annular metallic lip extending inwardly from the spacer body and diverging from the first annular lip, the lips being oriented with respect to the two joint members so that the second lip is adjacent the frusto-conical sealing surface of the second joint member, the first and second lips each having an annular portion diverging toward the first joint member and the frusto-conical sealing surface of the second joint member respectively, each diverging annular portion having only a line contact with the sealing surface of the respective adjacent joint member in final operative sealing position.

5. In a high pressure closure the combination comprising first and second joint members having separate sealing surfaces, a first annular member having a lip portion diverging from the annular member toward a sealing surface at an obtuse dihedral angle, a second annular member having a lip portion diverging from the annular member toward the other sealing surface at an obtuse dihedral angle, and a binding ring of U-shaped sectional configuration restraining the first and second annular members so that their respective diverging lips define an annulus of substantially V-shaped cross section, the binding ring having a dimension across both arms of the U less than the maximum diversion of the diverging lips of the annular members, each diverging lip portion having only a line contact with a sealing surface in final operative sealing position.

References Cited in the file of this patent

UNITED STATES PATENTS

| | | |
|---|---|---|
| 1,933,135 | Barthelmes | Oct. 31, 1933 |
| 2,263,653 | Smith | Nov. 5, 1941 |
| 2,277,824 | Franson | Mar. 31, 1942 |
| 2,467,061 | Mason | Apr. 12, 1949 |
| 2,709,092 | Wallace | May 24, 1955 |

FOREIGN PATENTS

| | | |
|---|---|---|
| 595,332 | France | July 13, 1925 |
| 311,147 | Switzerland | Jan. 31, 1956 |